United States Patent [19]

McConnell

[11] Patent Number: 4,729,484

[45] Date of Patent: Mar. 8, 1988

[54] PALLET RACK CONSTRUCTION

[75] Inventor: Kennedy McConnell, Flossmoor, Ill.

[73] Assignee: Interlake, Corporation, Oak Brook, Ill.

[21] Appl. No.: 829,842

[22] Filed: Feb. 12, 1986

Related U.S. Application Data

[63] Continuation of Ser. No. 541,953, Oct. 14, 1983, abandoned.

[51] Int. Cl.⁴ .................................................. A47F 5/00
[52] U.S. Cl. ...................................... 211/183; 211/191; 403/254
[58] Field of Search ............... 211/183, 191, 192, 183, 211/200; 108/56.3, 111; 403/254, 255

[56] References Cited

U.S. PATENT DOCUMENTS

| | | | |
|---|---|---|---|
| 2,252,570 | 8/1941 | Knuth | 211/183 |
| 2,948,409 | 8/1960 | Wroblewski et al. | 211/191 |
| 3,194,408 | 7/1965 | Kimpton | 211/183 X |
| 3,351,212 | 11/1967 | McConnell | 211/192 |
| 3,414,224 | 12/1968 | Robilliard et al. | 211/192 X |
| 3,465,895 | 9/1969 | Miller | 211/191 |
| 4,074,812 | 2/1978 | Skubic et al. | 211/192 |
| 4,154,419 | 5/1979 | Breidenbach | 211/192 X |
| 4,287,994 | 9/1981 | Klein | 211/191 |
| 4,423,817 | 1/1984 | Monjo-Rufi | 211/191 X |

Primary Examiner—Ramon S. Britts
Assistant Examiner—Blair Johnson
Attorney, Agent, or Firm—Allegretti, Newitt, Witcoff & McAndrews, Ltd.

[57] ABSTRACT

A pallet rack construction comprising beam and upright members which can be locked together rigidly to form a storage rack of superior strength. The improved rigidity is attributable to a novel connector on the end of the beam member which fits into a slot in the upright and by wedging action pulls the beam both endwise (axially) and sidewise (laterally) with respect to the upright.

6 Claims, 10 Drawing Figures

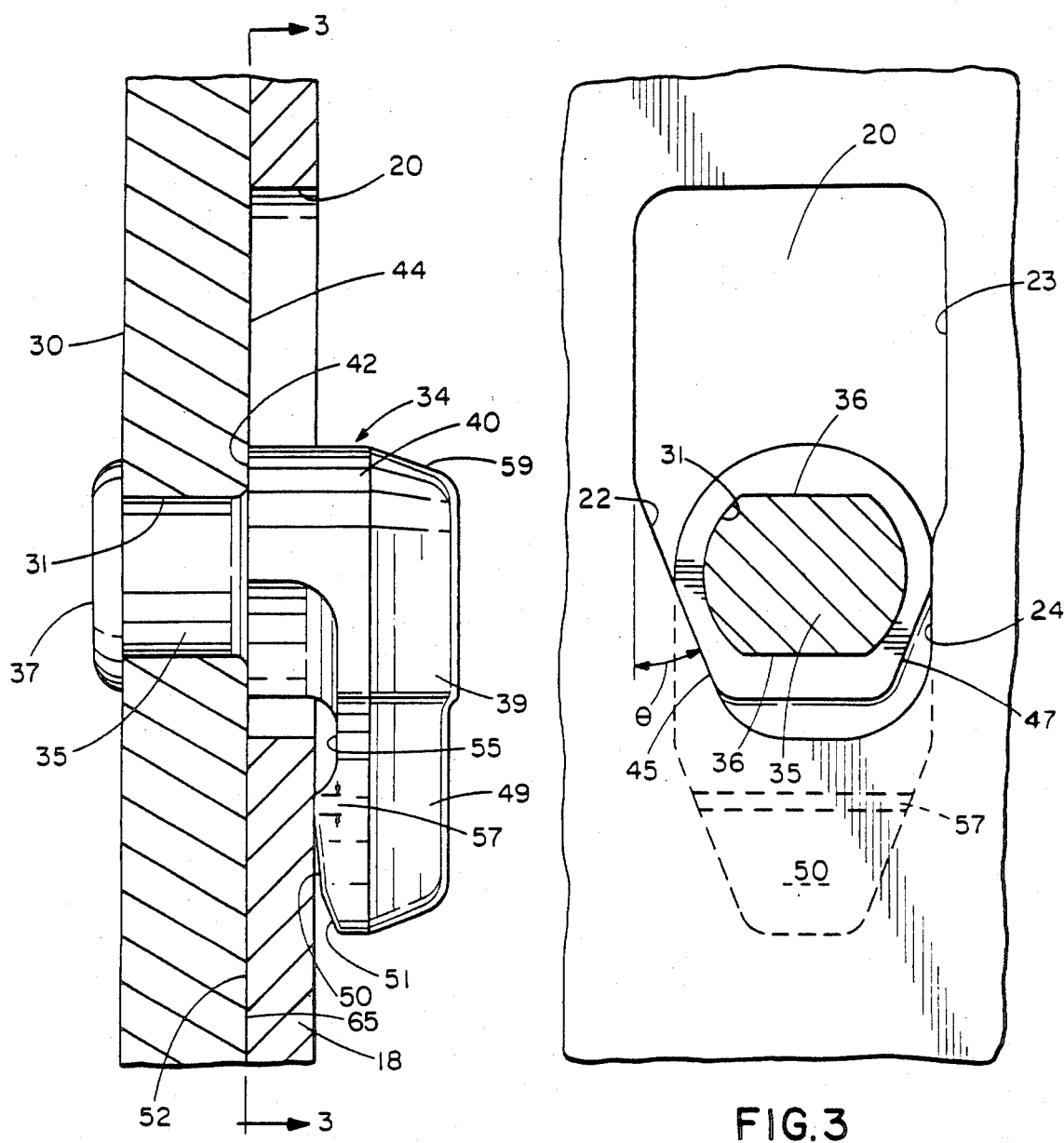
FIG.2
FIG.3
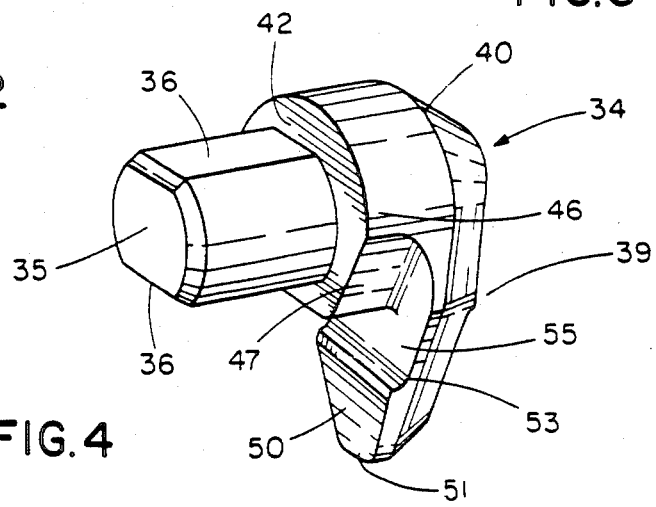
FIG.4

PALLET RACK CONSTRUCTION

This application is a continuation of application Ser. No. 06/541,953, filed Oct. 14, 1983, now abandoned.

This invention relates to a pallet rack characterized by an especially rigid connection between the uprights and the horizontal beam members detachably connected thereto.

In designing steel storage racks of this kind, it is desirable to make the connection between the beam and the upright as rigid as possible while still permitting disassembly of the parts. Increased rigidity at these joints provides increased capacity for the rack. It is the objective of designers to approach as closely as possible the rigidity of a welded connection, that is, a connection which is completely fixed.

THE PRIOR ART

In my U.S. Pat. No. 3,351,212, I describe an improved lug, or stud, which is fixed to the end of the beam member and fits into a canted keyhole slot in the upright member. The stud has flat lateral surfaces, one of which in the assembled rack structure, bears against an inclined edge of the canted keyhole slot to draw the beam endwise toward the face of the upright.

U.S. Pat. No. 3,414,224 describes a hook integrally connected to a truncated diamond-shaped base which fits into a hole in the wall of the beam bracket having a similar shape. The hook has tapered flanks which correspond to the tapered sides of the cooperating hole in the upright to prevent side-to-side movement of the hook. A nose on the end of the hook overlaps the margin of the cooperating hole to prevent front-to-back movement of the beam. When the beam and upright are assembled there is a gap between the side flange of the bracket on the end of the beam and the facing side flange of the upright. Thus, the joint lacks the rigidity which would be imparted by close contact between these parts. Obviously, the symmetrical tapered flanks of the hook do not bias the beam axially into close contact against the upright.

U.S. Pat. No. 3,070,237 also discloses a lug for connecting the end of a beam to an upright. The lug has an eccentric flange embracing the margin of the upright wall surrounding the keyhole slot in which the lug is mounted. The contact face of the lug flange is parallel to the wall of the upright, so there is no wedging action on the parts in the axial direction of the beam. In this construction, the keyhole slots are canted so that the shank of the lug slides down the inclined edge of the slot as the parts are assembled. The round shank of the lug makes tangential contact with the straight inclined edge. When the lug, and thus the beam, is forced downwardly during assembly, the lug, because of the very small bearing area, may distort the metal comprising the wall of the upright surrounding the slot. Thus, the desired tight contact between the side of the upright and the end of the beam is not achieved.

THE INVENTION

The present invention is an improvement over the structures disclosed in the prior art in that the pallet rack assembly is rigid and stronger. The perforations cut in the upright members are smaller and more effectively arranged to minimize the loss in strength attributable to the removal of metal. The improvement in rigidity is attributable to the fact that a novel connector on the end of the beam pulls the beam both endwise (axially) and sidewise (laterally) with respect to the upright to provide firm contact between the bracket on the end of the beam and the adjacent faces of the upright. The novel connector also provides increased contact area with the surface of the upright against which it bears. At the same time, the rigid connection can be broken with sufficient facility to disassemble the beam and the uprights.

In a preferred form of the invention, the connector has a peripheral collar which bears against an inclined edge of the cooperating opening in the upright, and serves to draw the beam into tight axial contact with the upright as the two parts are assembled. The connector also has a hook member which hooks over the edge of the opening in the upright, the bearing face of the hook being inclined so as to wedge the wall of the upright into tight lateral contact with the beam. The angle of inclination of the bearing face on the hook is an important feature of this invention. The invention also includes an improved locking bolt for preventative accidental dislodgment of the connector when assembled in position on the upright.

THE DRAWINGS

In the drawings,

FIG. 2 is a section taken along the line 2—2 in FIG. 1, greatly enlarged.

FIG. 3 is a section taken along the line 3—3 in FIG. 2.

FIG. 4 is a perspective view of the connector of the invention.

DETAILED DESCRIPTION

Figure 1:
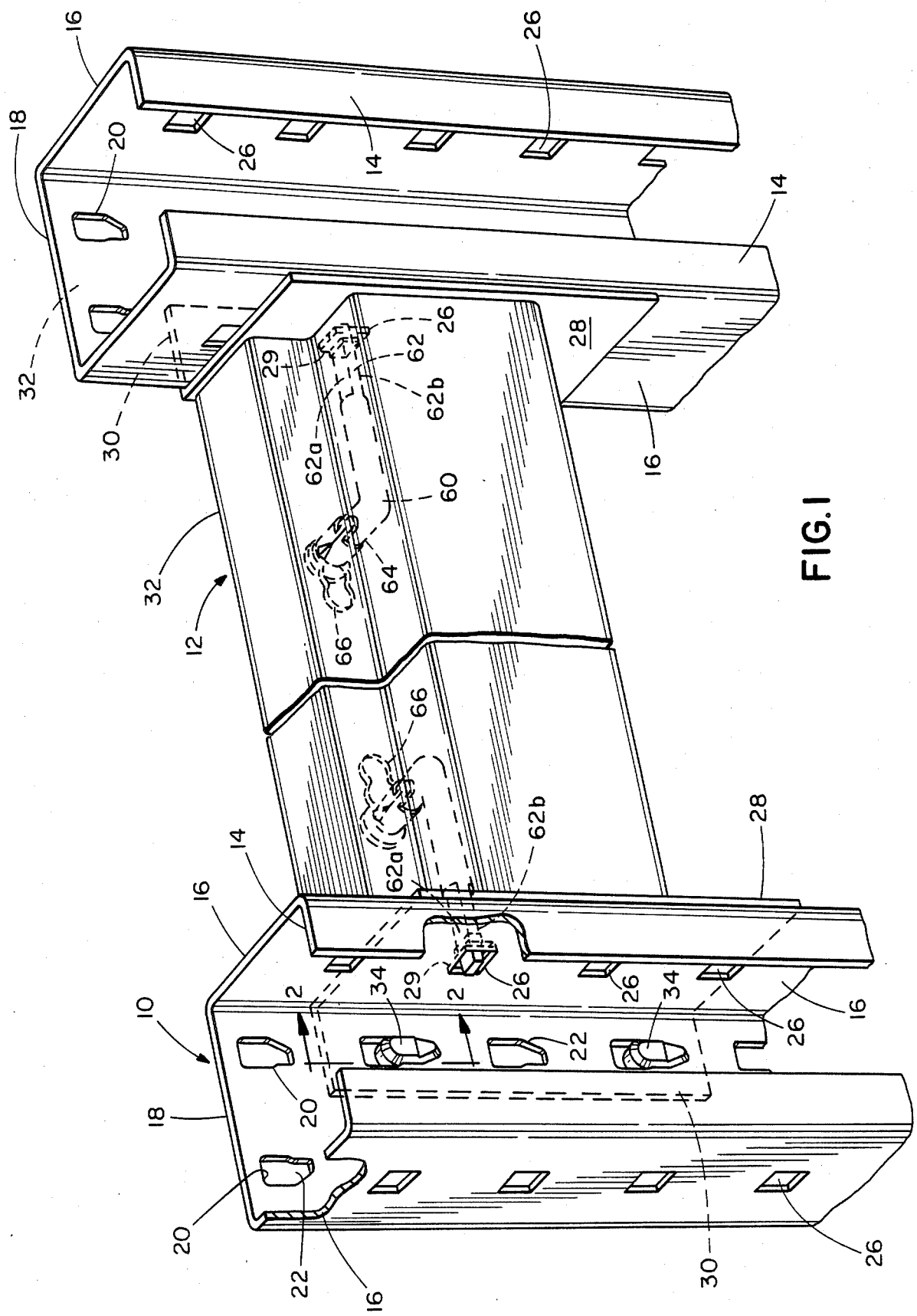
FIG. 1 is a perspective view of a beam (broken in the middle) extending between two uprights, the two members being connected by connectors constructed in accordance with the invention.

A portion of a typical rack is shown in FIG. 1, and comprises a pair of uprights 10 and a beam member 12 adapted to connect detachably at either end to the uprights, as shown and described in U.S. Pat. No. 3,351,212, to provide long racks for supporting pallets, one spaced above the other, in a warehouse.

Each upright 10 is a formed steel channel having inturned lips 14 at the rear edges of their flanges 16. The front face 18 of the upright is perforated with two rows of vertically disposed slots 20 of generally keyhole shape. As best shown in FIG. 3, the slots are narrower at their lower ends, having an inclined edge 22 facing the flanges 16 and an opposed vertical lower edge 24 which is slightly offset from the upper right hand edge 23 of the slot. The slots in adjoining rows are the mirror images of each other. The inclined edge 22 makes an angle θ of 22° with the vertical, for reasons explained below. Square holes 26 are provided in both flanges 16 of the upright, which holes are vertically offset with respect to the slots 20. With the holes and slots not aligned, the upright is stronger along any transverse planar section through the openings extending perpendicular to the axis of the upright.

Welded to each end of the beam 12 is a right angle vertical bracket 28 which embraces a corner of the upright when the beam is connected thereto. Flange 30 of bracket 28 is parallel to the face 32 of the beam 12 and carries a pair of connectors 34 welded to the flange or riveted to the flange by peening the end to form flange 37 (FIG. 2). The shank 35 of the connector, which extends through the opening 31 in the bracket, has opposed flats 36 (FIG. 3) which contact the cooperating flat edges of opening 31 in the flange 30 to prevent rotation of the connector and to orient the hook comprising part of the connector. Two connectors 34 (FIG. 1) are vertically spaced a distance equal to twice the distance between adjacent slots 20 in one row.

Figure 5:
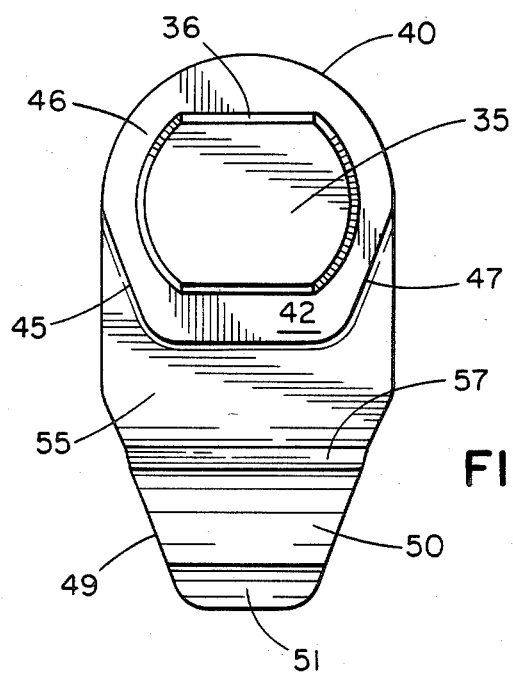
FIG. 5 is a rear elevational view of the connector shown in FIG. 4.
Figure 6:
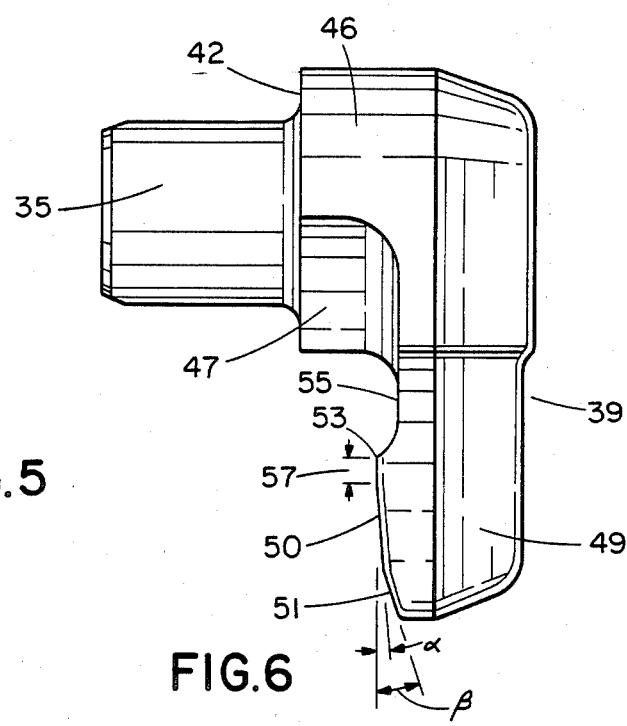
FIG. 6 is a side elevational view of the connector shown in FIG. 4.
Figure 7:
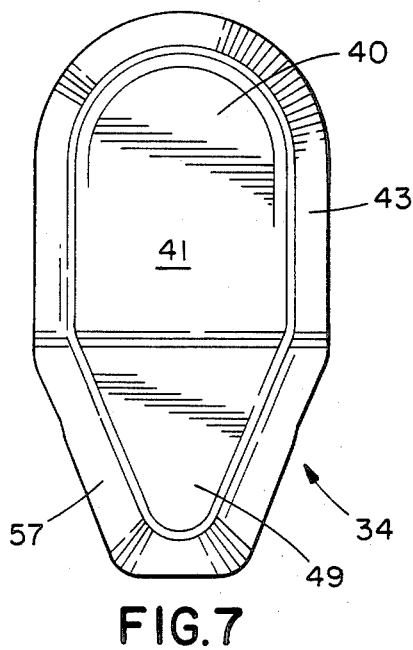
FIG. 7 is a front elevational view of the connector shown in FIG. 4.

Each connector 34 has a hook 39 extending downwardly at approximately right angles to the axis of the connector shank 35. The hook has an enlarged segment 40, rounded at the top and of larger diameter than the shank. A collar 46 comprising the inner part of segment 40, has a pair of symmetrical sloping perimetral surfaces 45,47 on either side of the shank 35 (FIG. 5). The inner face 42 of the collar constitutes a shoulder which abuts the face 44 of the flange 30. The hook 39 narrows down at its outer end to form a tapered pad portion 49, roughly triangular in shape, the inner surface 50 of which bears against the surface 65 of the upright 10 when the beam and upright are assembled. This pad or bearing surface 50 is larger than provided in previous constructions having a round peripheral flange extending from the stud as shown, for example, in my U.S. Pat. No. 3,351,212. The surface 50 is inclined toward the free or outer end of the hook at an angle α of about 4°. (FIG. 6) At the very end of the hook the angle is increased to provide a surface 51, which makes an angle β of about 20° with the vertical and which is obtuse with respect to the inclined surface 50. The inclined face 51 facilitates inserting the hook in slot 20. The top of surface 50 intersects a flat 57 which terminates in a sharp radius 53 below a relief groove 55, provided to facilitate coining of the surfaces 45,47 on the collar 46. The connector is dimensioned between the shoulder 42 and the surface 50 so that when the hook 39 is pushed down over the edge of the upright wall surrounding the opening 20, the flange 30 is urged by the inclined surface 50 into tight contact with the face 52 of the upright 10. (FIG. 2) As shown in FIG. 7, the front face 41, obverse to bearing surface 50 of the connector, is beveled around its entire periphery as indicated at 43. The beveled surfaces prevent catching the hook on the slot when a beam is being disassembled from an upright.

Figures 9, 10:
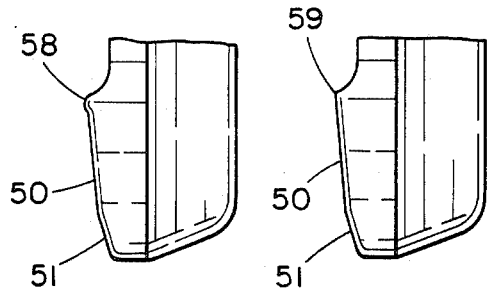
FIG. 9 is a view of the surface 50 broken away from FIG. 6, showing an alternative form of the invention in which the geometry of the surface has been modified.
FIG. 10 is a view like FIG. 9 showing still another geometric form of the surface 50.

The pad or bearing surface 50 may take alternative configurations at its top edge, as illustrated in FIGS. 9 and 10. In FIG. 9 the top of the surface 50 terminates in a slight ridge 58 which bites into the face 65 of the upright. The ridge 58 can be rounded to facilitate manufacture or it can be squared or sharpened. In FIG. 10 the surface 50 extends at a single angle to terminate in a sharp edge 59. A ridge or sharp edge enhances the gripping action.

The 4° angle for the surface 50 was selected to produce the desired wedging action without making the connection too loose or so tight that the upright and beam members cannot be disassembled with sufficient facility. If the incline exceeds the approximately 4°, the wedging action may be too abrupt to properly draw the parts together within the allowed small tightening movement of the parts. On the other hand, if the angle is less than 4°, the wedging action may be insufficient to draw the parts together within the allowed small tightening movement of the parts. It should be understood that effective wedging action occurs by drawing the parts together through axial movement of the connector of only a few thousandths of an inch. It would be difficult to employ a large angle within the tolerances of the parts as they are normally manufactured to effectively accommodate this small movement. It is believed that the effectiveness of the wedging action to create a tight joint may result from the slight deformation or yielding of the ordinarily painted abutting surfaces and the metal of the upright against which the hook 39 bears as it is engaged. This occurs when the angle is small. The approximately 4° angle seems to work well. When the the surface 57 and the upper portion of the surface 53 are substantially the entire area of the surfaces 50,57 is in contact with the face of member 18.

As shown in FIG. 3, the sloping perimetral surfaces 45,47 are inclined at an angle θ of 22° from the vertical when the connector is fixed in the flange 30 of the bracket. This angle corresponds to the angle of the edge 22 of slot 20 and produces an endwise tightening of the beam as the connector is positioned and pushed down toward the bottom of the slot. The angle θ is selected to properly effect lateral movement of the connector. It will be appreciated that the distance from the sloping surface 45 of the connector to the inside face of flange 28 is approximately equal to the distance from the upper end of inclined edge 22 to the external face of adjacent flange 16. The flange 16 of upright 10 is brought into contact with flange 28 on beam 12 as the connector slides down incline 22 because of this dimensional relationship.

As shown in FIG. 1, the righthand end of the beam connects to a slot 20 in the left side of member 18, while the lefthand end of the beam connects with a slot 20 on the right side of member 18. Likewise, the surface 47 on the right side of the collar 46, as viewed in FIG. 4, bears against the edge 22 of the slot 20 in the right side of member 18, while the surface 45 on the left side of the collar 46 bears against the edge 22 of a slot 20 in the left side of member 18. The matching angles on the sloping surfaces 45,47 and the slots provide a substantial bearing area along the straight edges 22 and the contacting surfaces 45,47. Because perimetral surfaces 45,47 are symmetrical, a single connector can be used interchangably at either the righthand or lefthand end of the beam rather than using two different connectors.

The side flanges 16 of the channel uprights 10 have a vertical row of square openings 26, each of which is staggered with respect to the slots 20 to minimize weakening of the upright in a plane normal thereto. To prevent the beam from being accidentally dislodged, as for example, by a lift truck operator placing pallets on the rack, the horizontal beams are provided with sliding bolts 60 which are positioned to slide through an opening 29 in the end flange 28 into one of the holes 26. This additional lock further improves the rigidity of the rack structure.

The L-shaped bolt 60 terminates in a rectangular end 62 which passes freely through a rectangular opening 29 through flange 28, and a rectangular hole in the flange 16. The head end 64 is adapted to slide in an elongated slot 66. The sliding bolts 60 and their operation are of the type shown and described in my U.S. Pat. No. 4,262,809, except for the improved rectangular shape of the end 62. The rectangular shape provides a flat upper surface 62a and a flat lower surface 62b. As shown in FIG. 1, surface 62a is adapted to engage the upper edge of the hole 26 if the beam 12 is urged upwardly, while the surface 62b is adapted to engage the lower edge of the hole 26 if the beam 12 is urged downwardly. This arrangement provides an improved flat bearing contact between a sliding bolt 60 and the hole edges, which is desirable over the prior round bolt in a round hole.

To assemble a horizontal beam to an upright, the end bracket 28 is brought into contact with the corner of the upright, and the connectors 34 on the brackets are inserted into the openings 20. The openings 20 are enlarged at the top to facilitate entry of the connector, but are not rounded as a true keyhole. This minimizes the amount of metal cut from the channel, because it permits the openings 20 to be shorter. The end of the beam is then pushed down manually, which causes the right angle bracket 28 on the beam to be tightened against the adjacent faces of the upright. This is caused by the cooperating inclined surfaces 45 on the collar and 22 on the slot which move the beam endwise or axially, and by the wedging action of hook 39 which moves the beam laterally against member 18 of the upright. The bolt 60 is then inserted into opening 26. The same procedure is followed in securing the other end of the beam to an upright. Both ends may also be secured simultaneously.

As mentioned above, the location of the connector with respect to the contacting surfaces of the upright and beam flange and the cooperating openings must be selected to produce the desired wedging. The dimensions and tolerances of the connector with respect to the thickness of the walls of the upright 10 and the bracket 28 also must be selected so that the contacting parts press tightly against each other to provide a rigid joint between these parts. This connection, when used with the uprights of the invention, provides rigidity in the rack superior to that achieved by prior art constructions.

Figure 8:
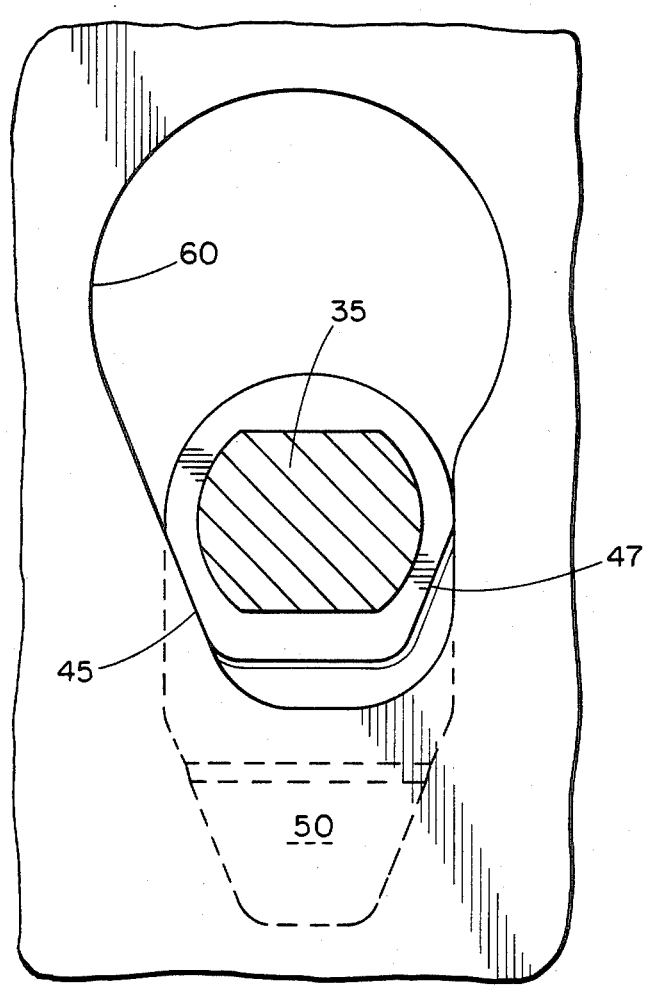
FIG. 8 is a view similar to FIG. 3 showing the connector of the invention mounted in a prior art keyhole slot.

Another advantage of the rack construction of the invention is that the beam will fit in an upright of the kind shown in U.S. Pat. No. 3,351,212, many of which are now in commercial use. This combination is shown in FIG. 8. The sloping perimetral surfaces 45,47 on the connector cooperate with the canted keyhole slots 60 in the uprights shown in that patent.

I claim:

1. In a rack structure comprising a slotted upright of rectangular cross section, the walls thereof having a thickness, and a beam terminating at each end in a bracket having a first embracing face parallel to the face of said beam, and a second embracing face at right angles to the face of said beam, embracing adjoining sides of said upright, improved means for locking the beam to the upright comprising
   a connector secured to the wall of said bracket adjacent said first embracing face, said connector having a hook spaced from said first embracing face, said hook being adapted to fit into a cooperating slot in said upright, said slot having at its lower end an inclined edge sloping away from said second embracing face, said connector being characterized by
   an outer end,
   a bearing surface spaced from said outer end facing said first embracing face,
      said surface being inclined slightly toward said outer end in a direction away from said embracing face, the top of said incline being spaced from said first embracing face a distance slightly less than the thickness of said upright wall, a portion of said inclined bearing surface being compressed against a marginal portion of said upright wall surrounding said slot when said hook is inserted in said cooperating slot, thus serving to draw the beam laterally into tight engagement with said upright
   a collar surrounding said connector between said first embracing face and said inclined bearing surface, and
   a groove cut into the face of said hook between said inclined surface and said collar,
   said collar having a sloping perimetral surface spaced from said second embracing face a distance less than the distance from said second embracing face to the lower portion of said inclined edge of said slot, so that when said hook is inserted in said slot said sloping perimetral surface slides down said inclined edge, thus serving to draw the beam endwise into tight engagement with said upright.

2. The rack structure of claim 1 in which said collar has two opposed sloping perimetral surfaces, one on each side of said collar for coaction with slots having either right or left hand inclined edges, and in which said inclined surface is inclined at an angle of approximately 4° from the plane of the first embracing face.

3. A connector for tightly securing an upright member having a slot, one edge of which is inclined, to a beam member, comprising
   a shaft for mounting the connector on said beam member,
   a collar concentric with and of greater periphery than said shaft having a sloping perimetral surface for coaction with said inclined edge of said slot,
   a generally flat hook connected to one end of said shaft adjacent said collar and extending approximately at right angles to the axis of said shaft,
      said hook having a bearing face comprising an inclined plane tipped slightly toward the outer end thereof away from the other end of said shaft, and
   a groove cut into said bearing face below said collar and intersecting said inclined plane in a direction generally normal to the axis of said shaft.

4. The connector of claim 3 in which said hook terminates at its outer end in an inclined face disposed at an obtuse angle to said inclined plane.

5. The connector of claim 4 in which said inclined plane is tipped at an angle of approximately 4°.

6. The structure of claim 1 which includes a bolt mounted for axial movement on said beam, said upright having an opening to receive said bolt to lock the beam against movement parallel to the longitudinal axis of the upright, said bolt having flat upper and lower surfaces corresponding to flat upper and lower bearing surfaces on the periphery of said opening.

* * * * *